US011895548B2

(12) United States Patent
Xu et al.

(10) Patent No.: US 11,895,548 B2
(45) Date of Patent: Feb. 6, 2024

(54) LINK MANAGEMENT FOR A CONNECTED USER EQUIPMENT

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Longda Xing, San Jose, CA (US); Murtaza A. Shikari, Mountain View, CA (US); Sethuraman Gurumoorthy, Cupertino, CA (US); Sree Ram Kodali, San Jose, CA (US); Srinivasan Nimmala, San Jose, CA (US); Srirang A. Lovlekar, Fremont, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 17/247,017

(22) Filed: Nov. 24, 2020

(65) Prior Publication Data

US 2021/0168682 A1    Jun. 3, 2021

(30) Foreign Application Priority Data

Nov. 28, 2019  (CN) .......................... 201911190754.7

(51) Int. Cl.
*H04W 36/00* (2009.01)
*H04W 76/23* (2018.01)
*H04W 88/04* (2009.01)

(52) U.S. Cl.
CPC ........... *H04W 36/03* (2018.08); *H04W 76/23* (2018.02); *H04W 88/04* (2013.01)

(58) Field of Classification Search
CPC ..... H04W 88/04; H04W 76/23; H04W 36/03; H04W 8/005; H04W 76/14; H04L 2001/0097

See application file for complete search history.

(56) References Cited

U.S. PATENT DOCUMENTS

2013/0182555 A1 * 7/2013 Raaf .................. H04W 76/19
370/216
2017/0013653 A1 * 1/2017 Suzuki ................ H04W 8/005
(Continued)

FOREIGN PATENT DOCUMENTS

WO    2014/069064    5/2014

OTHER PUBLICATIONS

LG Electronics Inc, "Path Switch Procedures fo Service Continuity", 3GPP, R2-1703028, Apr. 7, 2017.
(Continued)

*Primary Examiner* — Margaret G Mastrodonato
(74) *Attorney, Agent, or Firm* — Fay Kaplun & Marcin, LLP

(57) ABSTRACT

A base station may be configured to perform operations related to link management for a remote user equipment (UE). The operations comprising, transmitting configuration information to the remote UE and receiving information corresponding to a serving link associated with the remote UE. The operations further comprising determining that the serving link associated with the remote UE is to be switched from a first communication link to a second communication link. The operations further comprising, transmitting a message to the remote UE indicating that the serving link associated with the remote UE is to be switched from the first communication link to the second communication link. The operations further comprising, transmitting a message to a relay UE. The message is configured to trigger the relay UE to perform an operation corresponding to the serving link associated with the remote UE.

17 Claims, 10 Drawing Sheets

(56) References Cited

U.S. PATENT DOCUMENTS

| | | | | |
|---|---|---|---|---|
| 2018/0041605 A1* | 2/2018 | Zhang | ................... | H04W 4/70 |
| 2018/0098370 A1* | 4/2018 | Bangolae | .............. | H04W 88/04 |
| 2019/0037463 A1* | 1/2019 | Feng | .................... | H04W 76/14 |
| 2019/0141771 A1* | 5/2019 | Ma | ....................... | H04W 76/18 |
| 2019/0313315 A1 | 10/2019 | Xu et al. | | |
| 2020/0170075 A1* | 5/2020 | Xu | ..................... | H04W 72/042 |

OTHER PUBLICATIONS

Oppo, "Consideration on Solutions for Path Switch Between PC5 and Uu", 3GPP, R2-1704074, May 14, 2017.

* cited by examiner

LINK MANAGEMENT FOR A CONNECTED USER EQUIPMENT

BACKGROUND

A user equipment (UE) may establish a connection to at least one of multiple networks or types of networks. In some scenarios, the UE may communicate with the network using a direct communication link to a base station of the corresponding network. In other scenarios, the UE may communicate with the network using a UE to network relay. For example, the UE may establish a direct communication link with a further UE that is camped on a base station of the corresponding network. In this type of arrangement, data and information sent to the network by the UE may initially be transmitted to the further UE and then relayed to the base station by the further UE on behalf of the UE. For downlink communications intended for the UE, data and information may initially be sent to the further UE and then relayed to the UE by the further UE on behalf of the network.

The network may manage how the UE is to communicate with the network. That is, the network may determine whether the UE is to be configured to communicate directly with a base station or is to be configured to utilize a UE to network relay. The network may make this determination using information received directly or indirectly from any of a variety of sources including, but not limited to, the UE and the further UE.

SUMMARY

According to an exemplary embodiment a method is performed at a base station. The method comprising, transmitting configuration information to a remote user equipment (UE) and receiving information corresponding to a serving link associated with the remote UE. The method further comprising determining that the serving link associated with the remote UE is to be switched from a first communication link to a second communication link. The method further comprising, transmitting a message to the remote UE indicating that the serving link associated with the remote UE is to be switched from the first communication link to the second communication link. The method further comprising, transmitting a message to a relay UE. The message is configured to trigger the relay UE to perform an operation corresponding to the serving link associated with the remote UE.

According to another exemplary embodiment, a base station includes a communication interface and a processor configured to perform operations. The operations comprising transmitting configuration information to a remote user equipment (UE) and receiving information corresponding to a serving link associated with the remote UE. The operation further comprising, determining that the serving link associated with the remote UE is to be switched from a first communication link to a second communication link. The operations further comprising, transmitting a message to the remote UE indicating that the serving link associated with the remote UE is to be switched from the first communication link to the second communication link. The operations further comprising, transmitting a message to a relay UE. The message is configured to trigger the relay UE to perform an operation corresponding to the serving link associated with the remote UE.

According to a further exemplary embodiment, a method is performed by a remote user equipment (UE) configured to communicate with a network using a first communication link. The method comprising, receiving configuration information from the network and transmitting to the network one or more of i) measurement data corresponding to the first communication link or a second communication link or ii) preference information. The method further comprising, receiving from the network an indication to switch from the first communication link to the second communication link.

DETAILED DESCRIPTION

Figure 1:
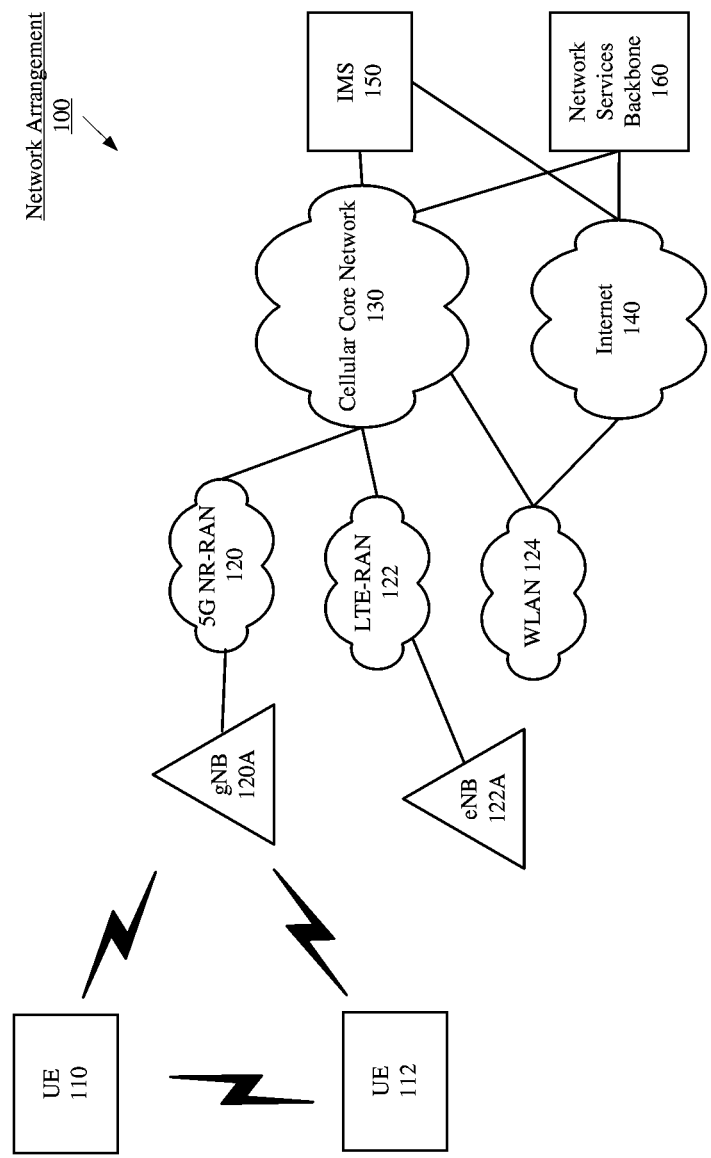
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods to implement various link management mechanisms. As will be described below, link management generally refers to establishing and maintaining a communication link that is to be utilized to communicate, directly or indirectly, with a network.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

To perform the full scope of functionalities normally available to the UE via a network connection, the UE may directly or indirectly communicate with a base station of the corresponding network. The UE may directly communicate with a currently camped base station. The UE may indirectly communicate with the base station using a UE to network relay. For example, the UE may be configured with a direct communication link to a further UE while the further UE is camped on the base station. In this type of arrangement, the further UE may serve as a relay for the UE. Thus, data and information sent to the network by the UE may initially be transmitted to the further UE and then relayed to the base station by the further UE on behalf of the UE. For downlink communications intended for the UE, data and information may initially be sent to the further UE and then relayed to the UE by the further UE on behalf of the network.

The exemplary embodiments may characterize the UE to network relay as a layer 2 (L2) relay. From the protocol stack perspective, the L2 relay may include one or more layers between the UE and the further UE, one or more layers between the UE and the base station, one or more layers between the UE and the core network, one or more layers between the further UE and the base station and one or more layers between the base station and the core network. However, those skilled in the art would understand that the exemplary embodiments are not limited to a L2 relay and may also apply to a layer 3 (L3) relay or any other appropriate type of relay. Accordingly, throughout this description the term "UE to network relay" may represent any appropriate configuration in which an electronic component (e.g., the further UE) operates as a relay between a UE and a base station.

The exemplary embodiments relate to link management. Throughout this description, the term "link management" generally refers to establishing and maintaining a communication link that is to be utilized by the UE to communicate, directly or indirectly, with a network. Link management may be controlled by the network, however, the term link management may encompass various operations performed at the UE, at one or more further UEs, one or more base stations, the radio access network (RAN) and the core network. Throughout this description reference to the network performing an operation may refer to an operation performed at a base station, at a RAN, at a core network, at a network function, at a network services backbone, a network server, any other type of network component or combination thereof.

Link management may include the network determining whether the UE is to communicate directly with a base station or indirectly with the base station using a UE to network relay. To differentiate between UEs, reference will be made to a "remote UE" and a "relay UE." The term "remote UE" may be used to identify a UE that is to operate as a remote endpoint from the base station. The remote UE may connect directly to the base station or indirectly communicate with the base station using a UE to network relay. Throughout this description, the terms UE and remote UE may be used interchangeably. The term "relay UE" may be used to identify a UE that may serve as a relay for the remote UE. The term relay UE is not intended to indicate that the relay UE is actively serving as a relay. Instead, the term relay UE indicates that the UE has the capability of operating as a relay for a remote UE. Further, the relay UE may also be configured as a remote UE simultaneously. Throughout this description, the terms UE, further UE and relay UE may be used interchangeably. However, any reference to a remote UE and a relay UE is merely for illustrative purposes, different networks may refer to similar concepts by a different name.

The exemplary embodiments describe various link management mechanisms for a remote UE in a radio resource control (RRC) connected state. Those skilled in the art will understand that when the UE is in the RRC connected state, the UE may exchange information and/or data with the connected network. The exchange of information and/or data may enable the UE to perform functionalities normally available via the network connection. Some exemplary scenarios described below may include the remote UE being configured with a UE to network relay and then switching to a direct communication link with the network, the remote UE being configured with a direct communications link with the network and then switching to a UE to network relay and the remote UE camping on a communication link with a first relay UE and switching to camping on a communication link of a second relay UE. As mentioned above, link management may include the network determining whether the remote UE is to communicate directly with a base station or indirectly using a UE to network relay. This determination may be made using information received from various sources including, but not limited to, the remote UE and one or more relay UEs.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a mobile phone, a tablet computer, a smartphone, a phablet, an embedded device, a wearable, an Internet of Things (IoT) device, a massive machine-type communication (mMTC) device, etc. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G New Radio (NR) radio access network (5G NR-RAN) 120, a LTE radio access network (LTE-RAN) 122 and a wireless local access network (WLAN) 124. However, the UEs 110, 112 may also communicate with other types of networks and the UEs 110, 112 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The base stations (e.g., the gNB 120A, the eNB 122A) may include one or more communication interfaces to exchange data and/or information with camped UEs, the corresponding RAN, the cellular core network 130, the internet 140, etc. Further, the base stations may include a processor configured to perform various operations. For example, the processor of the base station may be configured to perform operations related to link management. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate indirectly with the one or more networks using a UE to network relay. For example, the UE 110 may be a remote UE and the UE 112 may be a relay UE. In this example, the UE 112 may camp on the gNB 120A of the 5G NR-RAN 120 and the UE 110 may camp on the UE 112. Uplink communications from the UE 110 may initially be transmitted over a communication link to the UE 112. Subsequently, the UE 112 may relay the communication to the gNB 120A on behalf of the UE 110. Downlink communication from the gNB 120A to the UE 110 may initially be sent to the UE 112. Subsequently, the UE 112 may relay the communication to the UE 110 on behalf of the gNB 120A. Those skilled in the art would understand that in this example the gNB 120A, the 5G NR-RAN 120 and/or the core network 130 may manage the communication link between the UE 110 and the UE 112.

Throughout this description, the UE 110 may be referenced as a remote UE and the UE 112 may be referenced as a relay UE. However, this is only for illustrative purposes and is not intended to limit the exemplary embodiments in any way.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
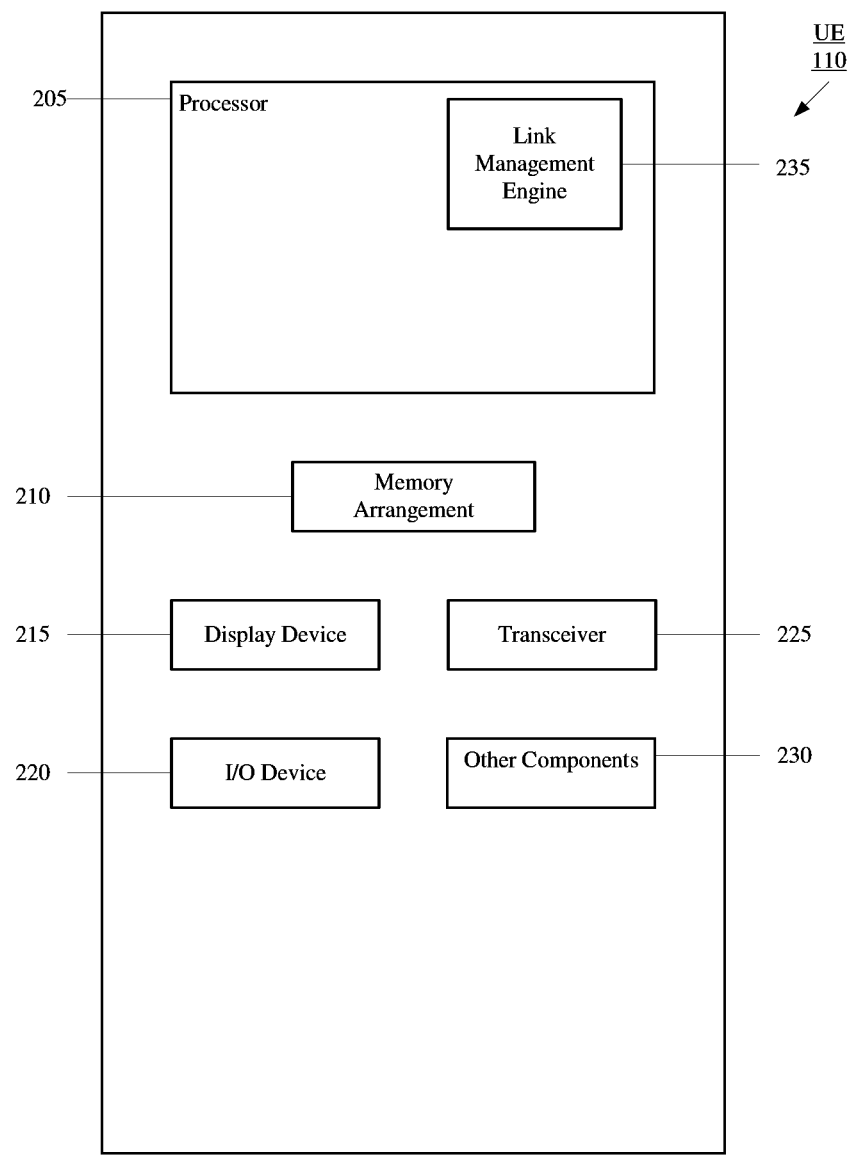
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, a SIM card, an audio input device, an audio output device, a power supply, a data acquisition device, ports to electrically connect the UE 110 to other electronic devices, etc. Those skilled in the art will understand that the UE 110 may represent any electronic component that is capable of operating as a remote UE and/or a relay UE.

The processor 205 may be configured to execute a plurality of engines of the UE 110. For example, the engines may include a link management engine 235. The link management engine 235 may perform various operations related to link management including, but not limited to, receiving configuration information from the network regarding link management, collecting measurement data and reporting information to the network that may be utilized for link management purposes.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, the UE 112, etc. Accordingly, the transceiver 225 may operate on a variety of different frequencies or channels (e.g., set of consecutive frequencies).

The UE 110 may be configured to be in one of a plurality of different operating states. One operating state may be characterized as RRC connected state and another operating state may be characterized as RRC idle state. RRC refers to the radio resource control (RRC) protocols. Those skilled in the art will understand that when the UE 110 is in an RRC connected state, the UE 110 may exchange information and/or data with the connected network. The exchange of information and/or data may enable the UE 110 to perform functionalities available via the network connection. Thus, the UE 110 may be in the RRC connected state when the UE 110 is camped on a base station or when the UE 110 is camped on a relay UE.

Further, those skilled in the art will understand that when the UE 110 is connected to the network and in RRC idle state the UE 110 is not exchanging data with the network and radio resources are not being assigned to the UE 110 within the network. However, when the UE 110 is operating in RRC idle state the UE 110 may listen for transmissions from the network.

When deployed within the network, the UE 110 may transition between operating states. For example, the UE 110 may be camped on a base station of a corresponding network and experience a connection issue. Subsequently, the UE 110 may transition from the RRC connected state to the RRC idle state. At this point, the UE 110 is still camped on the base station but is now in the RRC idle state. When the UE 110 is in the RRC idle state, the UE 110 may not be able to exchange data with the network. To exchange data with the network, the UE 110 may transition from the RRC idle state to the RRC connected state. Specifically, while in RRC idle state the UE 110 may listen for information such as but not limited to, primary synchronization signals (PSS) and secondary synchronization signals (SSS), Master Information Block (MIB), broadcast messages, System Information Block (SIB), paging notifications etc. In response, the UE 110 may issue a request to the network that indicates that the UE 110 wants to be moved to the RRC connected state. A successful transition from the RRC idle state to the RRC connected state may include the exchange of messages between the UE 110 and a base station (directly or indirectly via a UE to network relay). In the RRC connected state, a network context may be established between the network and the UE 110. Thus, the UE 110 may be assigned radio resources and the UE 110 may be able to exchange data with the network. The scenario described above is only intended to provide a general example of the UE 110 transitioning between the RRC connected state and the RRC idle state. Those skilled in the art would understand that the UE 110 may operate in a different RRC state (e.g., inactive state) and may transition between RRC states while the UE 110 is camped on the further UE 112.

The exemplary embodiments described below relate to the UE 110 operating in the RRC connected state. Throughout this description, the term "connected UE" may refer to a UE operating in the RRC connected state.

Figure 3:
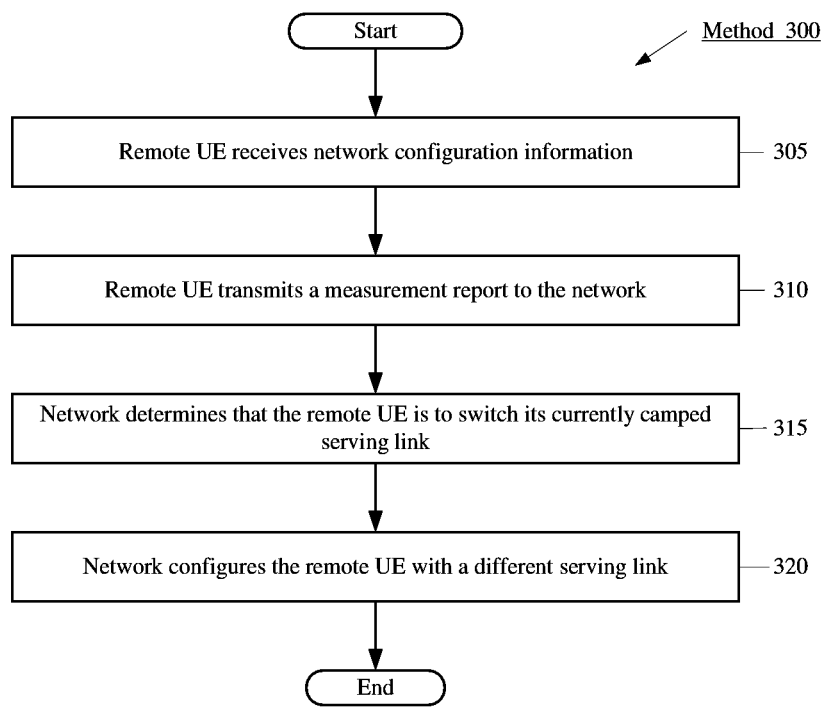
FIG. 3 shows a method for link management for a connected UE according to various exemplary embodiments.

FIG. 3 shows a method 300 for link management for a connected UE according to various exemplary embodiments. The method 300 will be described with regard to the network arrangement 100 of FIG. 1 and the UE 110 of FIG. 2.

In 305, a remote UE 110 receives network configuration information. For example, the UE 110 may initially be camped on the gNB 120A of the 5G NR-RAN 120. When camped, the UE 110 may receive configuration information related to link management. This configuration information may be received in a variety of different ways including, but not limited to, a system information block (SIB), an RRC procedure, control information, etc. In some embodiments, the UE 110 may receive this configuration information from the network via a relay UE 112. However, the exemplary embodiments are not limited to the remote UE 110 receiving configuration information in any particular manner.

The network configuration information may indicate to the remote UE 110 how the remote UE 110 is to provide the network with information related to link management. For example, the configuration information may indicate to the remote UE 110 that the remote UE 110 is to collect measurement data corresponding to a serving base station, a non-serving base station, a serving relay UE and a non-serving relay UE. The measurement data may be per base station, per relay UE or per frequency band. This measurement data may be subsequently provided to the network as part of link management for the remote UE 110.

The configuration information may also indicate when the remote UE 110 is to provide the network with the measurement data. For instance, the configuration information may indicate to the remote UE 110 that a measurement report is to be provided to the network periodically in accordance with a schedule or a timer. The configuration information may also indicate that the measurement report is to be provided based on a predetermined condition. For example, the remote UE 110 may be configured to collect measurement data corresponding to a serving link (e.g., a base station or a relay UE) and measurement data corresponding to non-serving entities (e.g., base stations, relay UEs, etc.). If the measurement data satisfies a predetermined threshold, the remote UE 110 may be triggered to provide the measurement report to the network. In some embodiments, the remote UE 110 may be triggered to provide a measurement report including measurement data already collected and in other embodiments the remote UE 110 may be configured to collect additional measurement data for the measurement report that is to be provided. As will be described below, the measurement data may be utilized by the network to determine whether the remote UE 110 should switch to a different serving link.

In 310, the remote UE 110 transmits a measurement report to the network. For example, the UE 110 may collect measurement data in accordance with the configuration information received in 305. Subsequently, the UE 110 may provide the gNB 120A with a measurement report. If the UE 110 is camped on the gNB 120A, the UE 110 may provide the measurement report directly to the gNB 120A. If the UE 110 is camped on the UE 112, the UE 110 may provide the measurement report indirectly to the gNB 120A via the UE 112. A person of ordinary skill in the art would understand the contents and format of the measurement report and how it is provided to the gNB 120A.

Link management may be applicable to a variety of different scenarios. As will be described below with regard to FIG. 4a-4c, the remote UE 110 may be configured to provide a measurement report in a variety of different scenarios. The network may determine that the serving link of the remote UE 110 is to be switched to a different serving link based on the measurement report.

Figure 4A:
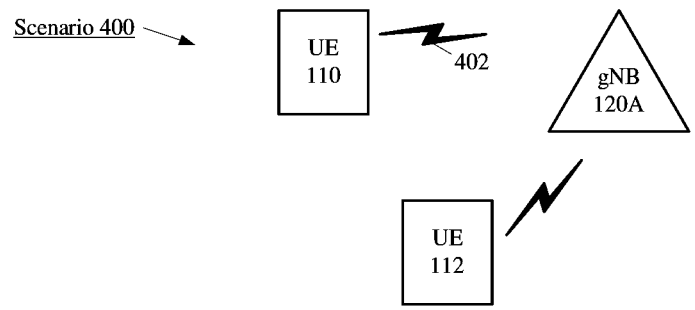
FIGS. 4a-4c each illustrate an exemplary scenario to related link management.
Figure 4B:
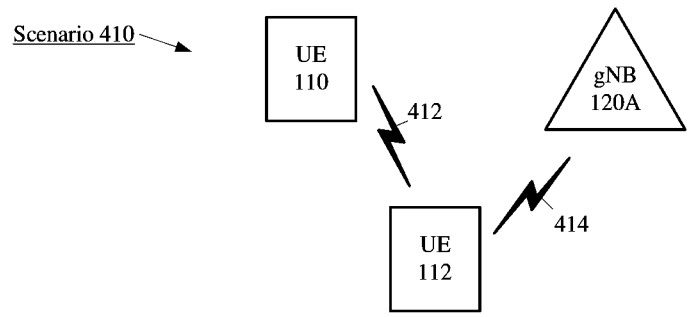
Figure 4C:
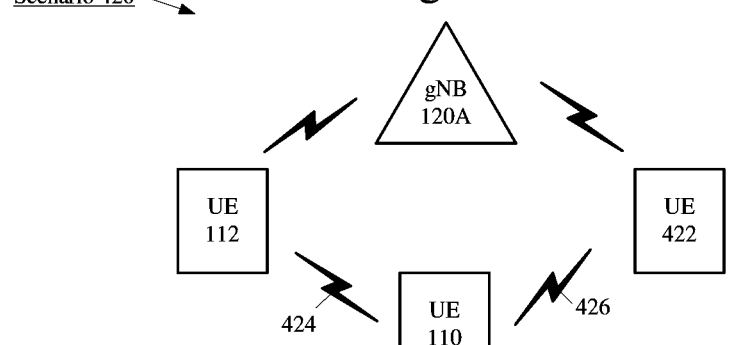

FIGS. 4a-4c each illustrate an exemplary scenario related link management. FIGS. 4a-4c will be described with regard to the network arrangement 100 of FIG. 1 and the UE 110 of FIG. 2.

FIG. 4a shows a scenario 400 that includes the UE 110, the UE 112 and the gNB 120A of the 5G NR-RAN 120. In the scenario 400, the UE 110 is camped on the gNB 120A and operating in the RRC connected state. Thus, the UE 110 is communicating with the gNB 120A directly and is not utilizing a relay to network UE. Those skilled in the art would understand that the interface between the 5G NR-RAN 120 and the UE 110 may be referred to as a Uu interface. Throughout this description, a direct communication link between a UE and a base station of the 5G NR-RAN 120 may be referred to as a "Uu link." Thus, in the scenario 400, the communication link 402 between the UE 110 and the gNB 120A is an example of a Uu link.

In the scenario 400, the UE 112 is also camped on the gNB 120A. There is no direct communication link between the UE 110 and the UE 112. During operation, the UE 110 may be configured to collect measurement data corresponding to the UE 112 and provide it to the network. The network may utilize this information to determine that the UE 110 should switch from the Uu link to a relay link with the UE 112.

FIG. 4b shows a scenario 410 that also includes the UE 110, the UE 112 and the gNB 120A of the 5G NR-RAN 120. In the scenario 410, the UE 110 is in the RRC connected state and configured with a UE to network relay. Thus, the UE 112 is camped on the gNB 120A and the UE 110 is connected to the UE 112 via the relay link 412. During operation, uplink communications from the UE 110 may initially be transmitted to the UE 112 via the relay link 412. Subsequently, the UE 112 may relay the uplink communications to the gNB 120A via the Uu link 414 on behalf of the UE 110. For downlink communications intended for the UE 110, the gNB 120A may initially transmit the communication to the UE 112 via the Uu link 414 of the UE 112. Subsequently, the UE 112 may relay the downlink communications to the UE 110 via the relay link 412 on behalf of the gNB 120A.

In the scenario 410, the UE 110 is not camped on the gNB 120A. Thus, there is no direct communication link (e.g., Uu link) between the UE 110 and the gNB 120A. During operation, the UE 110 may be configured to collect measurement data corresponding to the gNB 120A (and/or any other non-serving base stations) and provide the measurement data to the network. The network may utilize this information to determine that the UE 110 should switch from the relay link 412 to a Uu link with the gNB 120A. For example, based on the measurement data, the network may cause the UE 110 to switch from the scenario 410 of FIG. 4b to the scenario 400 of FIG. 4a or vice versa.

In the scenario 410, the UE 110 may be within the coverage area of the gNB 120A. However, since the UE 110 is communicating with the network via the UE 112, the UE 110 may be located outside of the coverage area of the gNB 120A. Thus, the scenario 410 may enable the UE 110 to communicate with the gNB 120A while the UE 110 is outside of the coverage area of the gNB 120A.

FIG. 4c shows a scenario 420 that includes the UE 110, the UE 112, a UE 422 and the gNB 120A of the 5G NR-RAN 120. In the scenario 420, both the UE 112 and the UE 422 are camped on the gNB 120A. The UE 110 is configured with a UE to network relay using the UE 112. Thus, there is no direct communication link between the UE 110 and the gNB 120A. During operation, the UE 110 may be configured to collect measurement data corresponding to the UE 422 and provide the measurement data to the network. The network may utilize this information to determine that the UE 110 should switch from the relay link 424 with the UE 112 to the relay link 426 with the UE 422.

In FIG. 4c the relay link 424 and the relay link 426 are both shown. This is not intended to demonstrate that both the relay link 424 and the relay link 426 are being configured at the same time. Instead, the relay link 424 and the relay link 426 are both shown to demonstrate that there may be scenarios in which the network causes a remote UE to switch from a first relay UE to a second relay UE. In an actual scenario, there may be multiple remote UEs and multiple relay UEs. Thus, the use of a single remote UE (e.g., UE 110) and two relay UEs (e.g., UE 112 and UE 422) is only provided for illustrative purposes.

As mentioned above the remote UE may provide the network with the measurement data in response to a predetermined condition. Examples of various predetermined conditions are described below with regard to FIGS. 4a-4c.

Initially, consider the scenario 400 of FIG. 4a. During operation, if the UE 110 determines that the quality of the connection via the Uu link 402 is less than a predetermined threshold or that the quality of the non-serving relay link associated with the UE 112 is greater than a predetermined threshold, the UE 110 may collect measurement data corresponding to the UE 112. The UE 110 may then provide the measurement data to the gNB 120A. The UE 110 may also collect measurement data corresponding to any other potential relay UE's within proximity to the UE 110. Subsequently, the network may switch the UE 110 from the Uu link 402 to a relay link with the UE 112 based on the measurement data.

Continuing with the scenario 400 of FIG. 4a, if the UE 110 determines that the difference in the quality of the non-serving relay link associated with the UE 112 and the quality of the Uu link 402 is greater than a predetermined threshold, the UE 110 may be triggered to provide measurement data to the network for the purposes of link management. Similarly, if the quality of the non-serving relay link is greater than a predetermined threshold and the quality of the Uu link 402 is less than a predetermined threshold the UE 110 may be triggered to provide measurement data to the network for the purposes of link management. The above described examples are merely provided for illustrative purposes and the exemplary embodiments may apply to providing measurement data to the network based on any appropriate condition.

Consider the scenario 410 of FIG. 4b, if the UE 110 determines that a quality of the relay link 412 is less than a predetermined threshold or the quality associated with a non-serving base station (gNB 120A) is greater than a predetermined threshold, the UE 110 may collect measurement data corresponding to the gNB 120A. The UE 110 may then provide the measurement data to the gNB 120A via the relay link 412. Subsequently, the network may switch the UE 110 from the relay link 412 to a Uu link with the gNB 120A based on the measurement data. The above described examples are merely provided for illustrative purposes and the exemplary embodiments may apply to providing measurement data to the network based on any appropriate condition.

Consider the scenario 420 of FIG. 4c, if the UE 110 determines that the quality of the serving relay link 424 is less than a predetermined threshold, the quality of the non-serving relay link 426 is a above a predetermined threshold or the quality of a non-serving base station (gnB 120A) is greater than a predetermined threshold, the UE 110 may collect measurement data corresponding to these links. The UE 110 may then provide the measurement data to the gNB 120A via the serving relay link 424. Subsequently, the network may switch the UE 110 from the relay link 424 to a Uu link with the gNB 120A or the relay link 426 based on the measurement data.

Continuing with the scenario 420 of FIG. 4c, if the UE 110 determines that the difference in the quality of the non-serving relay link 426 and the quality of the serving relay link 424 is greater than a predetermined threshold, the UE 110 may be triggered to provide measurement data to the network for the purposes of link management. Similarly, if the quality of the non-serving link is greater than a predetermined threshold and the quality of a serving link is less than a predetermined threshold, the UE 110 may be triggered to provide measurement data to the network for the purposes of link management. The above described examples are merely provided for illustrative purposes and the exemplary embodiments may apply to providing measurement data to the network based on any appropriate condition.

Returning to the method 300, in 315, the network determines that the remote UE is to switch its currently camped serving link. For example, based on a measurement report provided by the remote UE, the network may determine that a different serving link would provide the remote UE with better service. Switching the serving link of the remote UE may include switching from a Uu link to a relay link, switching from a relay link to a Uu link or switching from a first relay link to a second relay link. A person of ordinary skill in the art would understand that link management may also include configuring the remote UE with a different serving base station. Subsequently, the network may initiate signaling to switch the serving link for the remote UE.

In the example provided above, the determination made by the network is performed on the basis of the measurement report provided by the remote UE. However, the exemplary embodiments are not limited to the network making this determination on any particular basis. For example, the remote UE may be configured to provide the network with an indication of the remote UE's serving link preference. This indication may be provided with the measurement report or without the measurement report and cause the network to switch the remote UE's serving link. The remote UE may provide this indication of preference if the remote UE identifies that the quality of service (QoS) associated with the serving link has degraded, fallen below a threshold value or come within a particular range of a threshold value. In this type of scenario, the indication may identify that the remote UE desires to switch from the serving link to a different link due to the serving link's degradation in quality. The remote UE may also provide this indication of preference in scenarios that cause the remote UE to experience a power drain. For example, if the remote UE is configured with a Uu link in a poor coverage area, the remote UE may perform operations using high power and thus, experience a power drain. In this type of scenario, the indication may identify that the remote UE desires to switch from the serving link to a different link due to the power cost at the remote UE. The above examples are only provided for illustrative purposes and the exemplary embodiments may relate to the remote UE providing the network with an indication of the remote UE's serving link preference for any appropriate reason.

The determination made in 315 is not limited to explicit information provided by the remote UE. For example, the network may detect the quality of the remote UE's serving link on the network side. Thus, the network may make link management decisions for the remote UE based on measurements performed on the network side. In another example, the network may receive information from one or more relay UEs within the proximity of the remote UE. The relay UEs may provide information of radio or transmission quality related to a non-serving relay link available to the remote UE. The relay UEs may also provide information related to their respective Uu links. Thus, the network may utilize information received from the relay UEs to make link management decisions for the remote UE.

In 320, the network configures the remote UE with a different serving link. Various exemplary signaling diagrams related to switching the serving link of the remote UE are provided below in FIGS. 5-10.

Figure 5:
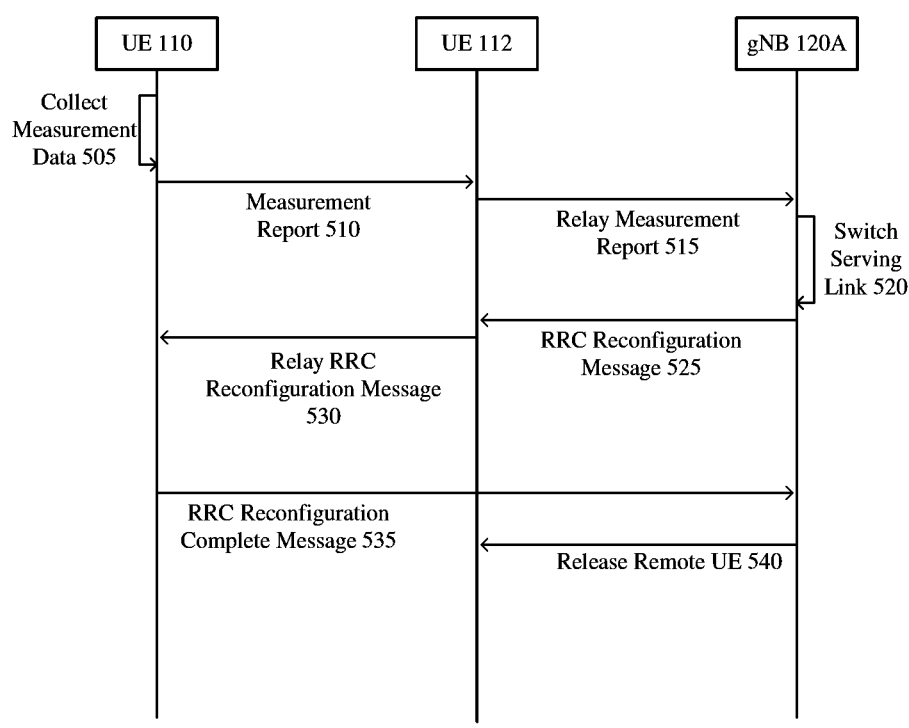
FIG. 5 shows a signaling diagram for switching the serving link of the remote UE from a relay link to a Uu link according to various exemplary embodiments.

FIG. 5 shows a signaling diagram 500 for switching the serving link of the remote UE from a relay link to a Uu link according to various exemplary embodiments. The signaling diagram 500 is described with regard to the network arrangement 100 of FIG. 1, the UE 110 of FIG. 2 and the method 300 of FIG. 3.

The signaling diagram 500 includes the UE 110 as the remote UE, the UE 112 as the relay UE and the gNB 120A of the 5G NR-RAN 120. Initially, the UE 110 is in RRC connected mode and camped on the UE 112 while the UE 112 is in RRC connected mode and camped on the gNB 120A. An example of this arrangement is shown in the scenario 410 of FIG. 4b.

In 505, the UE 110 collects measurement data. In this example, the measurement data may correspond to the serving relay link with the UE 112 and the non-serving gNB 120A. However, in other arrangements, the measurement data may correspond to other non-serving relay UEs and non-serving base stations.

As mentioned above, the UE 110 may perform measurements based on network configuration information. If the measurement data satisfies a predetermined threshold, the UE 110 may be triggered to provide a measurement report to the network. This allows the network to provide the UE 110 with a serving link that may provide better service than the currently camped serving link.

In 510, the UE 110 transmits a measurement report to the gNB 120A over the relay link with the UE 112. In this example, the UE 110 is currently camped on the UE 112 and thus, uplink communications to the gNB 120A are initially transmitted to the UE 112. The measurement report may include a variety of different types of information including, but not limited to, a relayID corresponding to the serving relay link, a relayID corresponding to a non-serving relay UE, a base station ID corresponding to a non-serving base station, explicit measurement data, etc.

In 515, the UE 112 relays the measurement report received from the UE 110 to the gNB 120A on behalf of the UE 110. In some embodiments, the UE 112 may also provide information corresponding to the UE 110 that the network may utilize for link management of the UE 110. This information may be included with the information relayed on behalf of the UE 110 or may be included in a separate message.

In 520, the network determines that the serving link for the UE 110 is to be switched from the relay link with the UE 112 to a Uu link with the gNB 120A. This determination may be performed on the basis of the measurement report. For example, the measurement report may indicate that the quality of the serving relay link for the UE 110 is inadequate, the UE 110 no longer prefers to be connected to the UE 112, the non-serving gNB 120A may provide better service, etc. However, as mentioned above, the network may also make this determination based on measurements performed on the network side or measurements performed by the UE 112.

In 525, the gNB 120A transmits an RRC reconfiguration message to the UE 110. Since, the UE 110 is still configured with the relay link to the UE 112, the RRC reconfiguration message is initially sent to the UE 112. In 530, the UE 112 relays the RRC reconfiguration message to the UE 110 on behalf of the gNB 120A. The RRC reconfiguration message indicates to the UE 110 that the UE 110 is to establish an RRC connection with the gNB 120A.

In 535, the UE 110 transmits an RRC reconfiguration complete message to the gNB 120A directly using a Uu link. This indicates to the network that the UE 110 has switched from the relay link of the UE 112 to the Uu link of the gNB 120A. In 540, the gNB 120 transmits a message to the UE 112 indicating to the UE 112 that the UE 112 can release the relay link to the UE 110.

The UE 110 is now in the RRC connected mode and camped on the gNB 120A. Thus, the arrangement changes from the scenario 410 of FIG. 4b to the scenario 400 of FIG. 4a.

Figure 6:
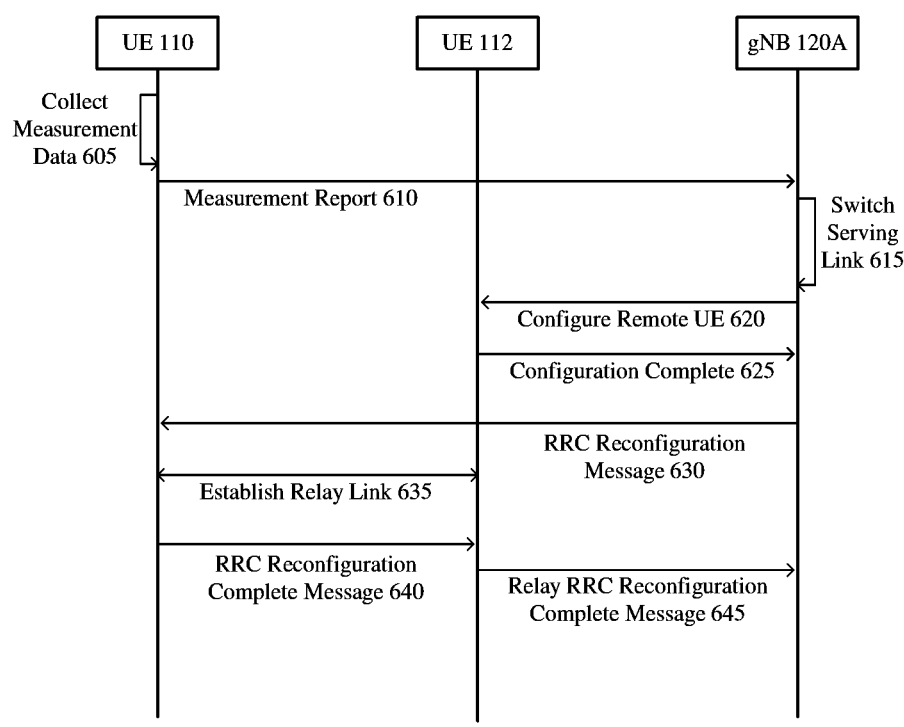
FIG. 6 shows a signaling diagram for switching the serving link of the remote UE from a Uu link to a relay link according to various exemplary embodiments.

FIG. 6 shows a signaling diagram 600 for switching the serving link of the remote UE from a Uu link to a relay link according to various exemplary embodiments. The signaling diagram 600 is described with regard to the network arrangement 100 of FIG. 1, the UE 110 of FIG. 2 and the method 300 of FIG. 3.

The signaling diagram 600 includes the UE 110 as the remote UE, the UE 112 as the relay UE and the gNB 120A of the 5G NR-RAN 120. Initially, the UE 110 is in RRC connected mode and camped on the gNB 120A while the UE 112 is also in RRC connected mode and camped on the gNB 120A. An example of this arrangement is shown in the scenario 400 of the FIG. 4a.

In 605, the UE 110 collects measurement data. In this example, the measurement data may correspond to the serving Uu link with the gNB 120A and the non-serving UE 112. However, in other arrangements, the measurement data may correspond to other non-serving relay UEs and non-serving base stations.

In 610, the UE 110 transmits a measurement report to the gNB 120A. Since the UE 110 is camped on the gNB 120A, the measurement report is transmitted directly to the gNB 120A over the Uu link. The measurement report may include a variety of different types of information including, but not limited to, a relayID corresponding to a non-serving relay UE, a base station ID corresponding to a non-serving base station, explicit measurement data, etc.

In 615, the network determines that the serving link for the UE 110 is to be switched from the Uu link with the gNB 120A to a relay link with the UE 112. This determination may be performed on the basis of the measurement report. For example, the measurement report may indicate that the quality of the serving Uu link for the UE 110 is inadequate, the UE 110 no longer prefers to be connected to the gNB 120A, the non-serving UE 112 may provide better service, etc. However, as mentioned above, the network may also make this determination based on measurements performed on the network side or measurements performed by the UE 112.

In 620, the gNB 120A transmits a message to the UE 112 including configuration information for the UE 110. This message may enable the UE 112 to serve as a relay for the UE 110. In 625, the UE 112 transmits a message to the gNB 120A indicating that the configuration is complete and the UE 112 is ready to connect to the UE 110.

In 630, the gNB 120A sends an RRC reconfiguration message to the UE 110 over the Uu link. Since the UE 110 is still camped on the gNB 120A, the RRC reconfiguration message is provided directly to the UE 110.

In 635, the UE 110 and the UE 112 participate in a signaling exchange to establish a serving relay link. In 640, the UE 110 transmits an RRC reconfiguration complete message to the gNB 120A. Since the UE 110 is now configured with a serving relay link, the RRC reconfiguration complete message is transmitted to the gNB 120A over the relay link. In 645, the UE 112 relays the RRC reconfiguration complete message to the gNB 120A on behalf of the UE 110.

In some embodiments, the UE 112 may activate the relay link and serve as the relay for the UE 110 based on receiving an acknowledgement (ACK) from the gNB 120A in response to the RRC reconfiguration complete message. Alternatively, the UE 112 may activate the relay link on any explicit or implicit indication received from the gNB 120A or any explicit or implicit indication received from the UE 110.

The UE 110 is now in the RRC connected mode and camped on the UE 112. Thus, the arrangement changes from the scenario 400 of FIG. 4a to the scenario 410 of FIG. 4b.

Figure 7:
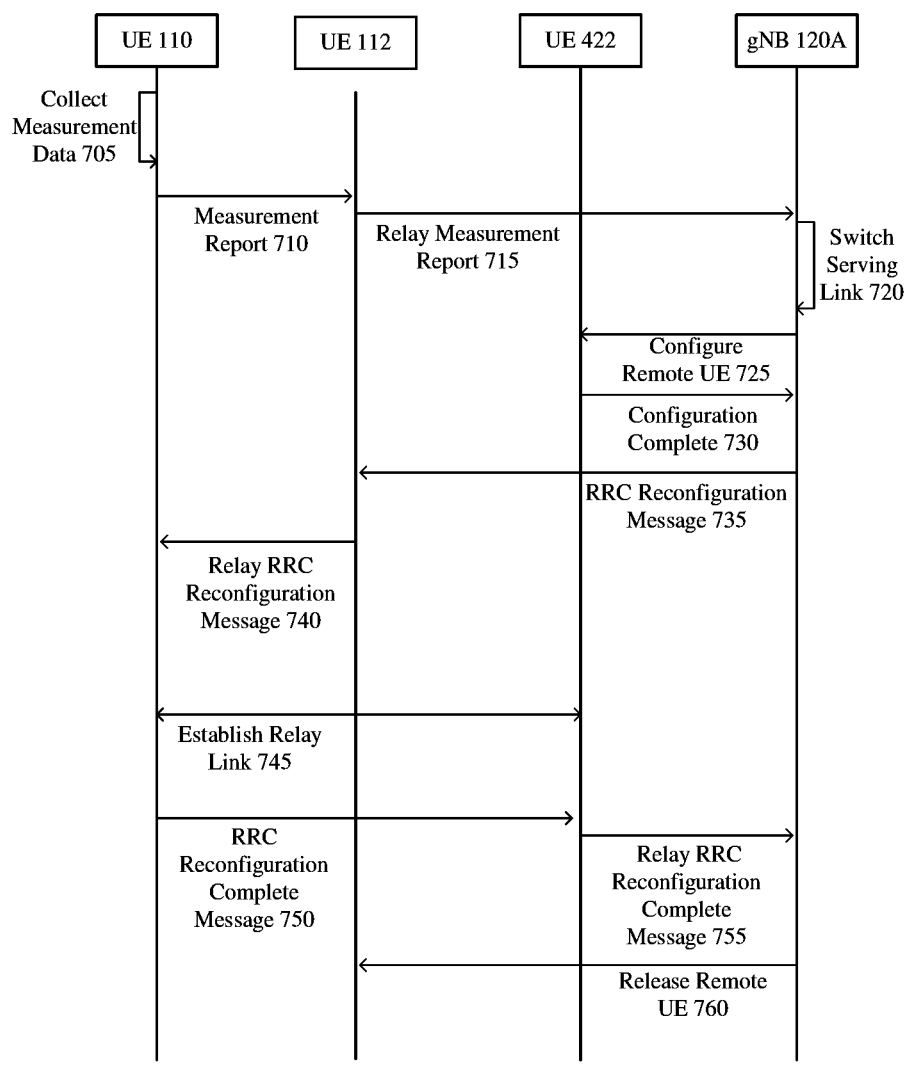
FIG. 7 shows a signaling diagram for switching the serving link of the remote UE from a first relay link to a second relay link according to various exemplary embodiments.

FIG. 7 shows a signaling diagram 700 for switching the serving link of the remote UE from a first relay link to a second relay link according to various exemplary embodiments. The signaling diagram 700 is described with regard to the network arrangement 100 of FIG. 1, the UE 110 of FIG. 2 and the method 300 of FIG. 3.

The signaling diagram 700 includes the UE 110 as the remote UE, the UE 112 as the first relay UE, the UE 422 as the second relay UE and the gNB 120A of the 5G NR-RAN 120. Initially, the UE 110 is in RRC connected mode and camped on the UE 112 while both the UEs 112, 422 are also in RRC connected mode and camped on the gNB 120A. An example of this arrangement is shown in the scenario 420 of the FIG. 4c where the relay link 424 is the serving relay link and the relay link 426 is a non-serving relay link.

In 705, the UE 110 collects measurement data. In this example, the measurement data may correspond to the serving relay link with the UE 112, the non-serving relay link with the UE 422 and the non-serving gNB 120A. However, in other arrangements, the measurement data may correspond to other non-serving relay UEs and non-serving base stations.

In 710, the UE 110 transmits a measurement report to the gNB 120A over the relay link with the UE 112. In this example, the UE 110 is currently camped on the UE 112 and thus, uplink communications to the gNB 120A are initially transmitted to the UE 112. The measurement report may include a variety of different types of information including, but not limited to, a relayID corresponding to the serving relay link, a relayID corresponding to a non-serving relay UE, a base station ID corresponding to a non-serving base station, explicit measurement data, etc.

In 715, the UE 112 relays the measurement report received from the UE 110 to the gNB 120A on behalf of the UE 110.

In 720, the network determines that the serving link for the UE 110 is to be switched from the relay link with the UE 112 to a relay link with the UE 422. This determination may be performed on the basis of the measurement report. For example, the measurement report may indicate that the quality of the serving relay link is inadequate, the UE 110 no longer prefers to be connected to the UE 112, the non-serving UE 422 may provide better service, etc. However, as mentioned above, the network may also make this determination based on measurements performed on the network side or measurements performed by the UE 112.

In 725, the gNB 120A transmits a message to the UE 422 including configuration information for the UE 110. This message may enable the UE 422 to serve as a relay for the UE 110. In 730, the UE 422 transmits a message to the gNB 120A indicating that configuration is complete and the UE 422 is ready to connect to the UE 110.

In 735, the gNB 120A transmits an RRC reconfiguration message to the UE 110. Since, the UE 110 is still configured with the relay link to the UE 112, the RRC reconfiguration message is initially sent to the UE 112. In 740, the UE 112 relays the RRC reconfiguration message to the UE 110 on behalf of the gNB 120A. The RRC reconfiguration message indicates to the UE 110 that the UE 110 is to establish an RRC connection with the UE 422.

In 745, the UE 110 and the UE 422 participate in a signaling exchange to establish a serving relay link. In 750, the UE 110 transmits an RRC reconfiguration complete message to the gNB 120A. Since the UE 110 is now configured with a serving relay link to the UE 422, the RRC reconfiguration complete message is transmitted to the gNB 120A over the relay link to the UE 422. In 755, the UE 422 relays the RRC reconfiguration complete message to the gNB 120A on behalf of the UE 110.

In 760, the gNB 120 transmits a message to the UE 112 indicating to the UE 112 that the UE 112 can release the relay link to the UE 110. The UE 110 is now in the RRC connected mode and camped on the UE 7422. With regard to the scenario 420 of FIG. 4C, the arrangement changes from the serving link being the relay link 424 to the serving link being the relay link 426.

As mentioned above, the network may also perform link management for the remote UE based on information received from the relay UE. For example, when the network configures the remote UE with a UE to network relay, the network may provide the relay UE with configuration information related to link management for the remote UE.

In some embodiments, the relay UE may be configured to measure the relay link of the remote UE. For example, the relay UE may be configured to collect measurement data corresponding to the radio quality level or transmission quality level of the relay link. The relay UE may collect this measurement data by measuring the relay link in the direction of the remote UE or may receive the measurement data from the remote UE in a remote UE to relay UE report. Unlike the measurement reports mentioned above, the remote UE to relay UE report may be generated for the relay UE. To provide another example, the relay UE may calculate the block error rate (BLER) in L2.

The relay UE may be configured to provide this measurement data periodically in accordance with a schedule or a timer. The relay UE may also be configured to provide this measurement data in response to a predetermined condition. For example, the relay UE may be configured to indicate to the network that a connection issue has occurred with the relay link if the collected measurement data falls below a threshold value or satisfies a predetermined condition. Other exemplary predetermined conditions may include, but are not limited to, the relay UE detecting that the relay link with the remote UE is broken, the relay UE detecting that the relay link with the remote UE does not satisfy QoS requirements, the relay UE detecting that a power drain or thermal situation is occurring at the relay UE, the relay UE detecting that performance of the relay UE is degrading due to the relay link, the relay UE detecting congestion of the relay link, the relay UE determining that the relay link is to be switched off/on and the relay UE determining that the relay UE is to offload all currently camped remote UEs.

If the relay UE is triggered to provide the information associated with the remote UE to the network, the network may utilize this information to switch the serving link of the remote UE. For example, signaling diagrams 500-700 were described with regard to the network switching the link of the remote UE based on measurement data collected by the remote UE and provided by the remote UE to the network. However, the network may make the same link switching determinations described in the signaling diagrams 500-700 using the information collected by the relay UE and provided by the relay UE to the network.

Figure 8:
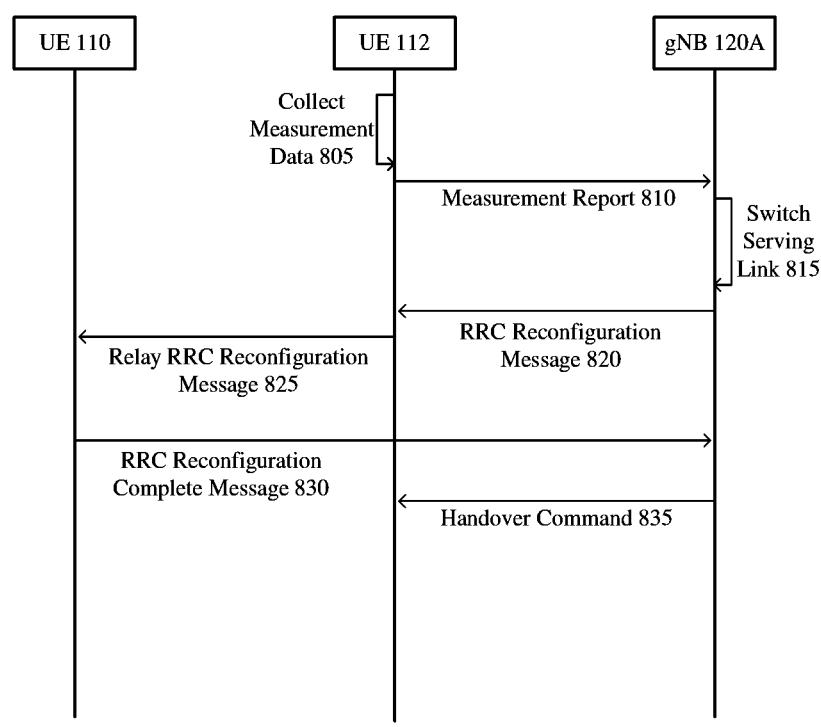
FIG. 8 shows a signaling diagram for switching the serving link of the remote UE based on information corresponding to the relay UE's Uu link according to various exemplary embodiments.

FIG. 8 shows a signaling diagram 800 for switching the serving link of the remote UE based on information corresponding to the relay UE's Uu link according to various exemplary embodiments. The signaling diagram 800 is described with regard to the network arrangement 100 of FIG. 1, the UE 110 of FIG. 2 and the method 300 of FIG. 3.

The signaling diagram 800 includes the UE 110 as the remote UE, the UE 112 as the relay UE and the gNB 120A of the 5G NR-RAN 120. Initially, the UE 110 is in RRC connected mode and camped on the UE 112 while the UE 112 is in RRC connected mode and camped on the gNB 120A. An example of this arrangement is shown in the scenario 410 of the FIG. 4b.

During operation, the network may determine that the serving relay link for the UE 110 is to be changed based on identifying a predetermined condition associated with the Uu link of the UE 112. For example, if the network determines that the quality of Uu link is degrading, the network may want to handoff the UE 112 to a different base station. Prior to the handoff, the network may switch the serving link of the remote UE.

In 805, the UE 112 collects measurement data. In this example, the measurement data may correspond to the Uu link of the UE 112.

In 810, the UE 112 transmits a measurement report to the gNB 120A. In 815, the network determines determine that a handoff of the UE 112 is to be performed to a different base station. Prior to performing the handoff, the network may switch the serving link of the UE 110.

In 820, the gNB 120A transmits an RRC reconfiguration message to the UE 110. Since the UE 110 is configured with a serving relay link to the UE 112, the RRC reconfiguration message is initially sent to the UE 112. In 825, the UE 112 relays the RRC reconfiguration message to the UE 110 on behalf of the gNB 120A.

The RRC reconfiguration message may instruct the UE 110 that the UE 110 is to switch its serving link from the relay link with the UE 112 to a different link. This may include switching the UE 110 from the relay link with the UE 112 to a Uu link with the gNB 120A, switching the UE 110 from the relay link with the UE 112 to a relay link with a further relay UE or switching the UE 110 from the relay link with the UE 112 to a Uu link with a further base station. In this example, the RRC reconfiguration information instructs the UE 110 that the UE 110 is to switch its serving link to a Uu link with the gNB 120A.

In 830, the UE 110 may transmit an RRC reconfiguration complete message to the gNB 120A.

In 835, the gNB 120A transits a handover command to the UE 112. Subsequently, the UE 112 may establish a connection to the network based on the handover command.

During operation, for any of a variety of different reasons, the link switching procedure may fail. An example of the link switching procedure failing at the remote UE is shown below in the signaling diagram 900 of FIG. 9 and an example of the link switching procedure failing at the relay UE is shown below in the signaling diagram 1000 of FIG. 10.

Figure 9:
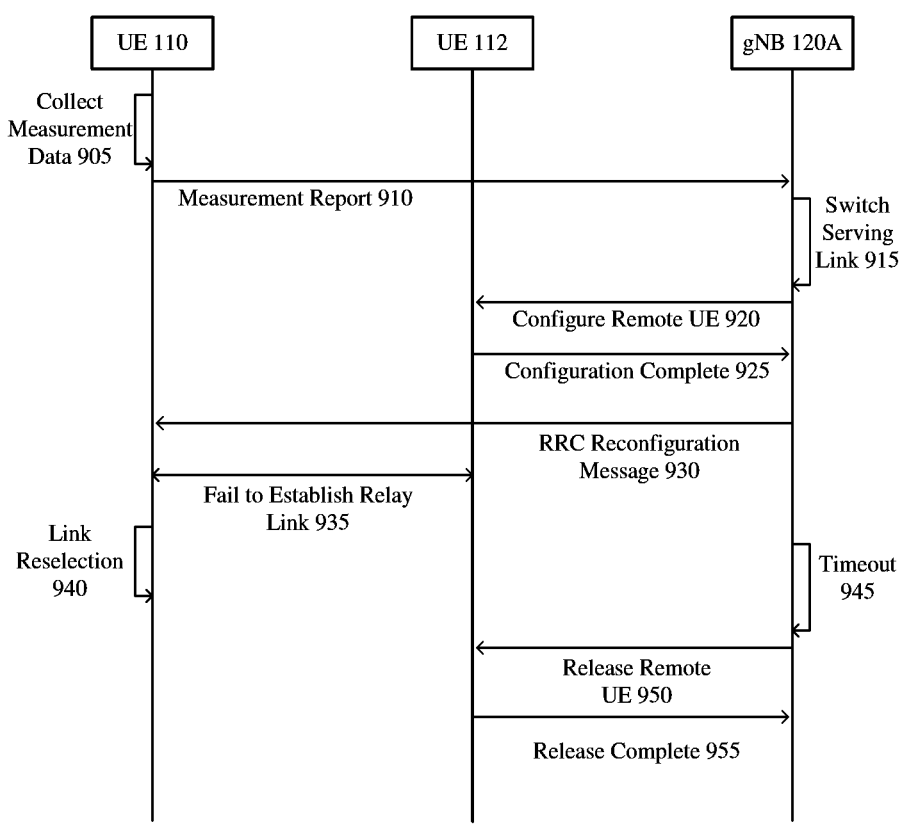
FIG. 9 shows a signaling diagram for unsuccessfully switching the serving link of the remote UE from a Uu link to a relay link according to various exemplary embodiments.

FIG. 9 shows a signaling diagram 900 for unsuccessfully switching the serving link of the remote UE from a Uu link to a relay link according to various exemplary embodiments. The signaling diagram 900 is described with regard to the network arrangement 100 of FIG. 1, the UE 110 of FIG. 2, the method 300 of FIG. 3 and the signaling diagram 600 of FIG. 6.

The signaling diagram 900 includes the UE 110 as the remote UE, the UE 112 as the relay UE and the gNB 120A of the 5G NR-RAN 120. Initially, the UE 110 is in RRC connected mode and camped on the gNB 120A while the UE 112 is also in RRC connected mode and camped on the gNB 120A. An example of this arrangement is shown in the scenario 400 of the FIG. 4a. While this example is described with regard to the above referenced scenario, those skilled in the art would understand that the concepts described for the signaling diagram 900 may be applicable to any scenario in which a link switching procedure fails at the remote UE.

In 905, the UE 110 collects measurement data. This is substantially similar to 605 of the signaling diagram 600 of FIG. 6.

In 910, the UE 110 transmits a measurement report to the gNB 120A. Since the UE 110 is camped on the gNB 120A, the measurement report is transmitted directly to the gNB 120A over the Uu link. In 915, the network determines that the serving link for the UE 110 is to be switched from the Uu link with the gNB 120A to a relay link with the UE 112. 910-915 are substantially similar to 610-615 of the signaling diagram 600 of FIG. 6.

In 920, the gNB 120A transmits a message to the UE 112 including configuration information for the UE 110. This message may enable the UE 112 to serve as a relay for the UE 110. In 925, the UE 112 transmits a message to the gNB 120A indicating that configuration is complete and the UE 112 is ready to connect to the UE 110. 920-925 are substantially similar to of the signaling diagram 600 of FIG. 6.

In 930, the gNB 120A sends an RRC reconfiguration message to the UE 110 over the Uu link. Since the UE 110 is still camped on the gNB 120A, the RRC reconfiguration message is provided directly to the UE 110.

In 935, the UE 110 attempts to establish a relay link with the UE 112. However, for any of a variety of different reasons, the attempt fails.

In 940, the UE 110 is triggered to perform link reselection. This may include tuning the transceiver 225 to various frequency bands, collecting measurement data and initiating a connection establishment procedure with a base station or a relay UE.

In 945, the gNB 120A experiences a timeout because the gNB 120A does not receive a RRC reconfiguration complete message from the UE 110. In 950, the gNB 120A sends an indication to the UE 112 that the UE 112 may release the configuration of relay link with the UE 110. In 955, the UE 112 may send a release complete message to the gNB 120A indicating that the relay link with the UE 110 has been released.

Figure 10:
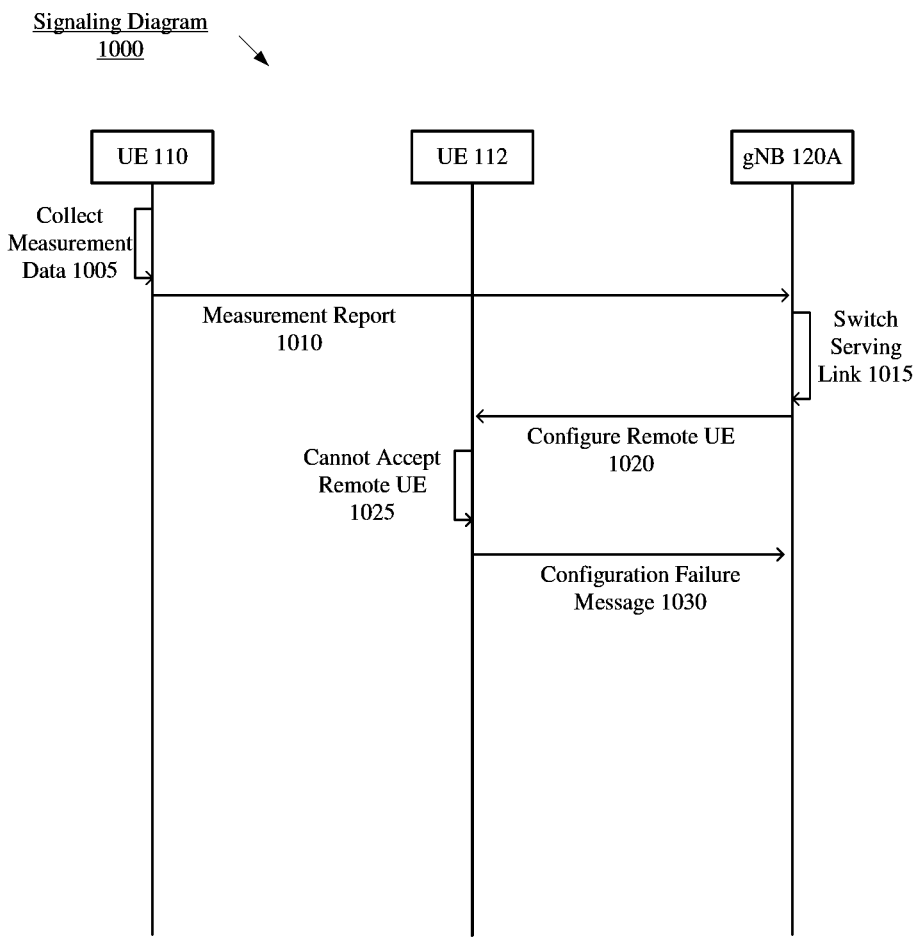
FIG. 10 shows a signaling diagram for unsuccessfully switching the serving link of the remote UE from a Uu link to a relay link according to various exemplary embodiments.

FIG. 10 shows a signaling diagram 1000 for unsuccessfully switching the serving link of the remote UE from a Uu link to a relay link according to various exemplary embodiments. The signaling diagram 1000 is described with regard to the network arrangement 100 of FIG. 1, the UE 110 of FIG. 2, the method 300 of FIG. 3 and the signaling diagram 600 of FIG. 6.

The signaling diagram 1000 includes the UE 110 as the remote UE, the UE 112 as the relay UE and the gNB 120A of the 5G NR-RAN 120. Initially, the UE 110 is in RRC connected mode and camped on the gNB 120A while the UE 112 is also in RRC connected mode and camped on the gNB 120A. An example of this arrangement is shown in the scenario 400 of the FIG. 4*a*. While this example is described with regard to the above referenced scenario, those skilled in the art would understand that the concepts described for the signaling diagram 1000 may be applicable to any scenario in which a link switching procedure fails at the relay UE.

In 1005, the UE 110 collects measurement data. This is substantially similar to 605 of the signaling diagram 600 of FIG. 6.

In 1010, the UE 110 transmits a measurement report to the gNB 120A. Since the UE 110 is camped on the gNB 120A, the measurement report is transmitted directly to the gNB 120A over the Uu link. In 1015, the network determines that the serving link for the UE 110 is to be switched from the Uu link with the gNB 120A to a relay link with the UE 112. 1010-1015 are substantially similar to 610-615 of the signaling diagram 600 of FIG. 6.

In 1020, the gNB 120A transmits a message to the UE 112 including configuration information for the UE 110.

In 1025, the UE 112 determines that the UE 112 cannot accept the UE 110. For example, the relay link of the UE 112 may lack the capacity to adequately serve the UE 110. However, this is only provided for illustrative purposes, and the relay UE may determine that it cannot accept a remote UE for any appropriate reason.

In 1030, the UE 112 transmits a relay link configuration failure message to the gNB 120A. Subsequently, the network may determine how to manage the serving link for the UE 110. For example, the network may decide to keep the UE 110 at the currently camped Uu link, to handoff the UE 110 to a different base station or to switch the Uu link to a relay link of a different relay UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent

What is claimed:

1. A method, comprising:
    at a base station:
        transmitting configuration information to a remote user equipment (UE);
        receiving information corresponding to a serving link associated with the remote UE;
        determining that the serving link associated with the remote UE is to be switched from a Uu link to a relay link;
        transmitting a radio resource control (RRC) reconfiguration message to the remote UE on the Uu link indicating that the serving link associated with the remote UE is to be switched from the Uu link to the relay link;
        transmitting a message to a relay UE, wherein the message is configured to trigger the relay UE to establish the relay link with the remote UE;
    receiving a RRC reconfiguration complete message from the remote UE via the relay link; and
        receiving a message from the relay UE, wherein the message indicates that the relay UE has detected that the relay link to the remote UE is broken.

2. The method of claim 1, wherein the message indicating that the serving link associated with the remote UE is to be switched from the Uu link to the relay link is configured to trigger the remote UE to establish the relay link with the relay UE.

3. The method of claim 1, wherein the information corresponding to the serving link associated with the remote UE is received directly from the remote UE over a Uu link.

4. The method of claim 1, wherein the message to the remote UE indicating that the serving link associated with the remote UE is to be switched from the Uu link to the relay link is transmitted directly to the remote UE over the Uu link.

5. The method of claim 1, wherein determining that the serving link associated with the remote UE is to be switched from the Uu link to the relay link is based on initiating a handover of the relay UE to a further base station.

6. The method of claim 1, further comprising:
receiving a message from the relay UE, the message indicating that the relay UE cannot accept the remote UE.

7. The method of claim 1, wherein the message from the relay UE indicating that the relay UE has detected that the relay link to the remote UE is broken is based on measurement data collected by the relay UE on the relay link, the method further comprising receiving the measurement data from the UE.

8. The method of claim 7, further comprising using the measurement data to switch to a new serving link associated with the remote UE.

9. A base station, comprising:
a communication interface; and
a processor configured to perform operations, the operations comprising:
transmitting configuration information to a remote user equipment (UE);
receiving information corresponding to a serving link associated with the remote UE;
determining that the serving link associated with the remote UE is to be switched from a Uu link to a relay link;
transmitting a radio resource control (RRC) reconfiguration message to the remote UE on the Uu link indicating that the serving link associated with the remote UE is to be switched from the Uu link to the relay link;
transmitting a message to a relay UE, wherein the message is configured to trigger the relay UE to establish the relay link with the remote UE;
receiving a RRC reconfiguration complete message from the remote UE via the relay link; and
receiving a message from the relay UE, wherein the message indicates that the relay UE has detected that the relay link to the remote UE is broken.

10. The base station of claim 9, wherein the message indicating that the serving link associated with the remote UE is to be switched from the Uu link to the relay link is configured to trigger the remote UE to establish a relay link with the relay UE.

11. The base station of claim 9, wherein the information corresponding to the serving link associated with the remote UE is received directly from the remote UE over a Uu link or indirectly from the remote UE via a relay link.

12. The base station of claim 9, wherein the message to the remote UE indicating that the serving link associated with the remote UE is to be switched from the Uu link to the relay link is transmitted directly to the remote UE over the Uu link.

13. The base station of claim 9, wherein determining that the serving link associated with the remote UE is to be switched from the Uu link to the relay link is based on initiating a handover of the relay UE to a further base station.

14. The base station of claim 9, wherein the message from the relay UE indicating that the relay UE has detected that the relay link to the remote UE is broken is based on measurement data collected by the relay UE on the relay link, and the operations further comprising receiving the measurement data from the UE.

15. The base station of claim 14, the operations further comprising using the measurement data to switch to a new serving link associated with the remote UE.

16. A method, comprising:
at a remote user equipment (UE) configured to communicate with a network using a first communication link:
receiving configuration information from the network;
transmitting to the network one or more of i) measurement data corresponding to the first communication link or a second communication link or ii) preference information;
receiving radio resource control (RRC) reconfiguration message from the network on a Uu link, the RRC reconfiguration message comprising an indication that a communication link of the remote UE is to be switched from the Uu link to a relay link;
establishing the relay link to the relay UE; and
transmitting a RRC reconfiguration complete message to the network via the relay link.

17. The method of claim 16, wherein the first communication link comprises a first relay link with a first UE and the second communication link comprises a second relay link with a second UE.

* * * * *